B. FRAZEE.
MODE OF OPERATING MILL SAWS.
No. 10,130.
PATENTED OCT. 18, 1853.
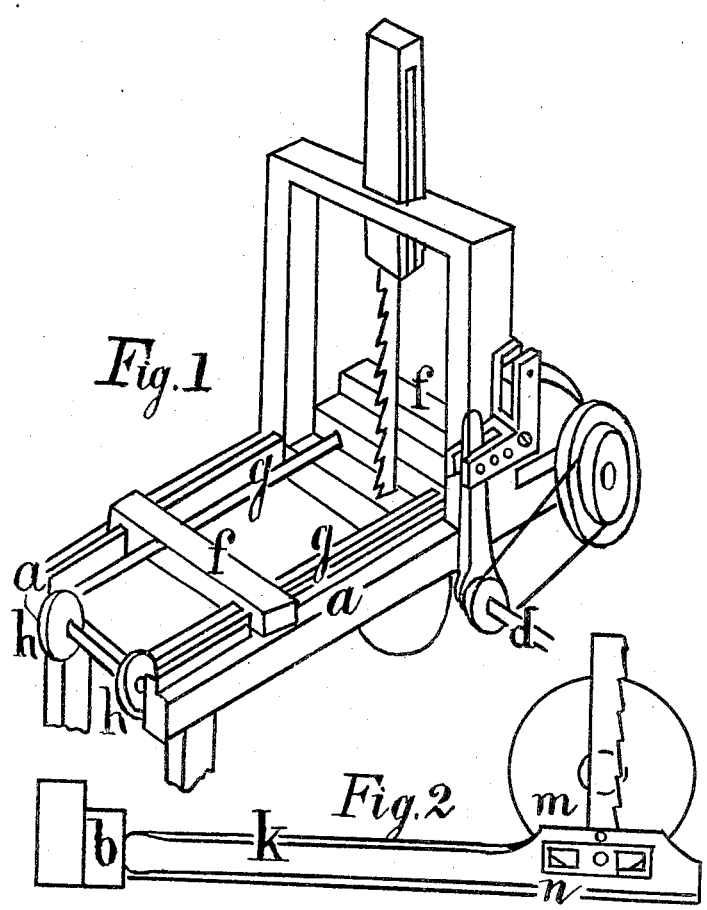
Taken from Patent Office Report
Vol of 1853.
Only Drawing Accessible (1913)

UNITED STATES PATENT OFFICE.

BENJ. FRAZEE, OF DURHAMVILLE, NEW YORK.

MODE OF OPERATING MILL-SAWS.

Specification of Letters Patent No. 10,130, dated October 18, 1853.

*To all whom it may concern:*

Be it known that I, BENJAMIN FRAZEE, of Durhamville, Oneida county, and State of New York, have invented an Improved Portable Muley-Sawmill; and I do hereby declare that the following is a full, clear, and exact description of the same, reference being had to the accompanying drawing, forming a part of this specification.

The nature of my invention consists in the advantageous simple and cheap manner or method of attaching the saw blade to the main shaft, by which, a reciprocating movement is imparted to the saw in such a manner that the saw will draw into the log on its downward movement and draw out from the log and clear itself on its upward movement. The whole machine being constructed without the usual incumbrances of sash, pitman, carriage, geared or cogged pinions, enables it to be constructed cheaper than other mills and by persons possessing little mechanical skill; and there being but few bearings about it there will be comparatively little friction and the wear and tear will of course be proportionately decreased.

Figure 1, of said drawing, represents a perspective view; Fig. 2, a detached portion showing the connection of the saw with the main shaft, in each of which figures like parts are designated by the same letters of reference.

$a, a$, the horizontal sills of the main frame supported in any well known manner; $b, b$, the stanchions connected by the cross tie $c$, forming the frame for sustaining the upper end of the saw blade; $d$, the main shaft which receives its motion from any prime mover by the band connection $e$; $f, f$, the two head blocks which are not attached to a carriage in the usual manner but are connected together by the endless chains $g, g$, which pass over pulleys $h, h$, on horizontal shafts at each end of the frame and have one turn around the pulleys on the feeding shaft which is operated by the ratchet wheel and hand or pawl, connected with the main shaft by an eccentric or as in the usual manner. Thus by this simple arrangement of the head blocks with the feed shaft through the intervention of the endless chains the log is sustained, fed to the saw, and run back, in a very desirable manner. The saw $j$ is adjusted in the frame in the usual manner of saws without a sash which is called the "muley" arrangement. It is connected directly with the main shaft in a peculiar manner, by which a more desirable movement is given to it (which is not the usual rectilinear movement) without the use of a pitman and in such a manner as to clear itself in a perfect manner when on its upper movement and to act more effectually upon the log when on its downward movement.

$k$, is a lever fulcrumed at $l$ having a slot cut in its other end which slot works over the wrist or crank pin $n$ of the balance wheel of the main or driving shaft, and the lower end of the saw blade is connected with this lever at $m$, so that, when the balance wheel is put in motion a reciprocating movement is communicated to the saw blade.

The lever $k$ is adjustable on its fulcrum and it must be so adjusted as when the saw is at the end of its downward stroke it must assume a horizontal position, so that, when it carries the saw upward, the saw will be drawn out and when it carries the saw downward the saw will be drawn in, thus causing the saw not to reciprocate in a straight line but in such a manner as to cause it to clear itself when on the upward stroke and draw into the action of the log or timber when on its downward or cutting stroke. By this simple arrangement the necessity of adjusting the saw sash out of a right angle with the plane of the timber to be cut so as to enable the saw to clear itself on its upward stroke and act effectually upon the timber on its downward stroke is obviated.

I have a modification of the arrangement for connecting the saw directly to the driving shaft, which is different from that above described but as it is described in a caveat which I have filed in the Patent Office I deem it unnecessary to describe it here.

Having thus fully described the nature of my invention what I claim therein as new and desire to secure by Letters Patent is,

Attaching a reciprocating saw blade to the main shaft, by means of a slotted lever and crank pin, operating in the manner and for the purposes hereinbefore substantially set forth.

In testimony whereof I have hereunto signed my name before two subscribing witnesses.

BENJAMIN FRAZEE.

Witnesses:
H. H. YOUNG,
T. S. SMITH.